United States Patent
Buck et al.

(10) Patent No.: US 12,398,835 B2
(45) Date of Patent: Aug. 26, 2025

(54) FLUID COUPLINGS

(71) Applicant: Colder Products Company, Roseville, MN (US)

(72) Inventors: Samuel C. Buck, Saint Paul, MN (US); Sascha A. Castriotta, Bloomington, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 18/706,928

(22) PCT Filed: Nov. 4, 2022

(86) PCT No.: PCT/US2022/048927
§ 371 (c)(1),
(2) Date: May 2, 2024

(87) PCT Pub. No.: WO2023/081335
PCT Pub. Date: May 11, 2023

(65) Prior Publication Data
US 2024/0418307 A1 Dec. 19, 2024

Related U.S. Application Data

(60) Provisional application No. 63/276,122, filed on Nov. 5, 2021.

(51) Int. Cl.
*F16L 37/098* (2006.01)
(52) U.S. Cl.
CPC ....... *F16L 37/0985* (2013.01); *F16L 2201/10* (2013.01)

(58) Field of Classification Search
CPC ..... F16L 37/0985; F16L 37/08; F16L 37/084; F16L 37/0847; F16L 37/098; F16L 37/12; F16L 37/133; F16L 37/50; F16L 37/53
See application file for complete search history.

(56) References Cited

U.S. PATENT DOCUMENTS

| | | | |
|---|---|---|---|
| 4,991,882 A * | 2/1991 | Gahwiler | F16L 37/084 285/423 |
| 5,401,063 A | 3/1995 | Plosz | |
| 5,823,702 A | 10/1998 | Bynum | |
| 2002/0070549 A1 | 6/2002 | Romero | |
| 2008/0277923 A1 | 11/2008 | Brandt et al. | |

OTHER PUBLICATIONS

International Preliminary Report on Patentability in International Appln. No. PCT/US2022/048927, mailed on May 16, 2024, 8 pages.
International Search Report and Written Opinion in International Appln. No. PCT/US2022/048927, mailed on Feb. 8, 2024, 15 pages.

\* cited by examiner

*Primary Examiner* — Aaron M Dunwoody
(74) *Attorney, Agent, or Firm* — Fish & Richardson P.C.

(57) ABSTRACT

This document describes fluid coupling devices for fluid handling systems. For example, this document describes male and female couplings that can be snapped together, and that are disconnectable by manually compressing an ovular collar of the female coupling. Some fluid coupling devices described herein are well suited for use in systems that provide liquid cooling for heat generating devices such as batteries, power sources, electronics, computer hardware and the like. Moreover, the fluid coupling devices described herein are also suitable for many other fluid coupling uses.

9 Claims, 5 Drawing Sheets

FLUID COUPLINGS

CROSS-REFERENCE TO RELATED APPLICATIONS

This application is a National Stage application under 35 U.S.C. § 371 of International Application No. PCT/US2022/048927 having an International Filing Date of Nov. 4, 2022, which claims the benefit of U.S. Provisional Application Ser. No. 63/276,122, filed Nov. 5, 2021. The disclosure of the prior application is considered part of (and is incorporated by reference in) the disclosure of this application.

BACKGROUND

1. Technical Field

This document relates to fluid coupling devices for fluid handling systems. For example, some embodiments described in this document relate to male and female couplings that can be snapped together, and that are disconnectable by manually compressing an ovular collar of the female coupling.

2. Background Information

Some fluid handling systems may require fluid couplings that can be used to readily and securely connect a fluid flow path. For example, fluid coupling devices used in systems that provide fluid for liquid cooling of heat-generating devices such as batteries, electronics, computer hardware, and the like can benefit from compact fluid couplings that provide a secure but releasable connection.

SUMMARY

This document describes fluid coupling devices for fluid handling systems. For example, this document describes male and female couplings that can be snapped together, and that are disconnectable by manually compressing an ovular collar of the female coupling. Some fluid coupling devices described herein are well suited for use in systems that provide liquid cooling for heat generating devices such as batteries, power sources, electronics, computer hardware and the like. Moreover, the fluid coupling devices described herein are also suitable for many other fluid coupling uses.

The fluid coupling devices described herein may also be referred to herein as male and female couplings, "coupling halves," and/or "connectors." The male couplings may also be referred to herein as "inserts," and the female couplings may also be referred to herein as "bodies."

In one aspect, this disclosure is directed to fluid couplings that include a male coupling and a female coupling. The male coupling defines a first longitudinal axis and an open flow path extending along the first longitudinal axis between both ends of the male coupling. The male coupling comprises: (i) a cylindrical body portion having a first outer diameter and (ii) a ridge portion attached to the cylindrical body portion and having a second outer diameter that is larger than the first outer diameter. The female coupling defines a second longitudinal axis and an open flow path extending along the second longitudinal axis between both ends of the female coupling. The female coupling comprises: (i) a first end portion comprising a termination structure configured for attaching a fluid conduit to the female coupling and (ii) a second end portion comprising an inner sleeve and an ovular outer collar radially surrounding the inner sleeve. The ovular outer collar comprises: (i) a pair of first wall portions that face each other and are spaced apart at a first distance and (ii) a pair of second wall portions that face each other and are spaced apart at a second distance that is greater than the first distance. While the male and female couplings are connected together: (a) the inner sleeve is radially within the cylindrical body portion of the male coupling; (b) the ovular outer collar is radially outside of the cylindrical body portion of the male coupling; and (c) the ridge portion extends into each of the openings defined by the pair of first wall portions.

Such a fluid coupling may optionally include one or more of the following features. The second end portion of the female coupling may include a first seal member. While the male and female couplings are connected together, the first seal member may fluidly seal against a first cylindrical inner wall portion of the male coupling. An outer diameter of a first seat at which the first seal member is positioned may be smaller than a width of at least one of the openings. The second end portion of the female coupling may include a second seal member. While the male and female couplings are connected together, the second seal member may seal against a frustoconical inner wall portion of the male coupling. An outer diameter of a second seat at which the second seal member is positioned may be smaller than a width of at least one of the openings. The second end portion of the female coupling may include a second seal member. While the male and female couplings are connected together, the second seal member may fluidly seal against a second cylindrical inner wall portion of the male coupling. The ovular outer collar may be bisymmetrical. A junction between the first and second end portions of the female coupling may comprise an area of reduced strength. Each of the second wall portions of the ovular outer collar may define an opening. An end of the ovular outer collar may define a scallop along one or both of the second wall portions.

In another aspect, this disclosure is directed to a female coupling. The female coupling includes a main body defining a longitudinal axis and an open flow path extending along the longitudinal axis between both ends of the main body. The main body comprises: (i) a first end portion comprising a termination structure configured for attaching a fluid conduit to the female fluid coupling and (ii) a second end portion comprising an inner sleeve and an ovular outer collar radially surrounding the inner sleeve. The ovular outer collar comprises: (i) a pair of first wall portions that face each other and are spaced apart at a first distance and (ii) a pair of second wall portions that face each other and are spaced apart at a second distance that is greater than the first distance. Each first wall portion of the pair of first wall portions defines an opening. Such a female coupling may optionally include one or more of the following features. The female fluid coupling may also include a first seal member and a second seal member. The first and second seal members may be positioned on the inner sleeve. In some embodiments, an outer diameter of a first seat at which the first seal member is positioned is smaller than a width of at least one of the openings, and an outer diameter of a second seat at which the second seal member is positioned is smaller than the width of the at least one of the openings. The ovular outer collar may be bisymmetrical. In some embodiments, a junction between the first and second end portions of the main body comprises an area of reduced strength. Each of the second wall portions of the ovular outer collar may define an opening. An end of the ovular outer collar may define a scallop along each of the second wall portions.

In another aspect, this disclosure is directed to a method disconnecting any of the male and female couplings described herein. The method includes (1) compressing the pair of second wall portions toward each other to increase the first distance to be greater than the second outer diameter of the ridge portion of the male coupling; and (2) longitudinally separating the male and female couplings from each other during the compressing.

Particular embodiments of the subject matter described in this document can be implemented to realize one or more of the following advantages. First, in some embodiments, the male and female portions of the fluid coupling devices are designed to be easily coupleable to each other. For example, in some embodiments the coupling technique can be a simple one-step process of snapping-in-place the female coupling onto the male coupling.

Second, in some embodiments, the male and female portions of the fluid coupling devices are designed to be easily disconnectable from each other. For example, the uncoupling technique can be a simple process that includes compressing an ovular collar of the female coupling and axially separating it from the male coupling. No tools are required for the disconnection technique.

Third, in some embodiments, the male and female portions of the fluid coupling devices are designed to securely couple together. In some embodiments, the securement mechanism includes a ridge portion on the male coupling and corresponding openings in an outer ovular collar of the female coupling. The arrangement is designed to provide robust coupling strength. Accordingly, the potential for premature or inadvertent disconnection of the male and female portions of the fluid coupling is advantageously reduced.

Fourth, the fluid couplings described herein are designed for ease of manufacture. For example, in some embodiments the fluid couplings include only three component parts and seal members. In some embodiments, the component parts are especially designed for ease of manufacture by injection molding and/or machining processes.

Fifth, the fluid couplings described herein are designed to provide audible "click" sounds when the male and female portions of the fluid coupling are snapped together in the coupled configuration. Accordingly, the user can be assured of proper coupling by the audible feedback provided by the couplings.

Sixth, the fluid couplings described herein are designed to provide tactile feedback when the male and female portions of the fluid coupling are snapped together in the coupled configuration.

Seventh, in some embodiments the female portion of the fluid coupling is designed with an area of reduced strength so that, in the event of an application of excessive force to the fluid coupling, a breakage of the fluid coupling will occur in a predictable and controlled location and manner.

Eighth, in some embodiments the fluid couplings advantageously include multiple seal members. A first seal member can provide a fluid sealing function, and a second seal member can provide isolation from the external environment.

Ninth, in some embodiments the fluid couplings include open areas to allow for environmental fluids to drain away from internal regions of the fluid couplings. For example, in some embodiments an end of the ovular outer collar of the female coupling can include one or more scallops that define such open areas.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION OF ILLUSTRATIVE EMBODIMENTS

This document describes fluid coupling devices for fluid handling systems. For example, this document describes male and female couplings that can be snapped together, and that are readily disconnectable by manually compressing an ovular collar of the female coupling. Some fluid coupling devices described herein are well suited for use in systems that provide liquid cooling for heat generating devices such as batteries, power sources, electronics, computer hardware and the like. Moreover, the fluid coupling devices described herein are also suitable for many other fluid coupling uses.

Referring now to FIGS. 1-5, an example fluid coupling 100 can be used to convey fluid. As used herein, the term "fluid" means any substance that can be made to flow including, but is not limited to, liquids, gases, granular or powdered solids, mixtures or emulsions of two or more fluids, suspensions of solids within liquids or gases, gels, vapors, steam, mists, etc., without limitation.

Figure 3:
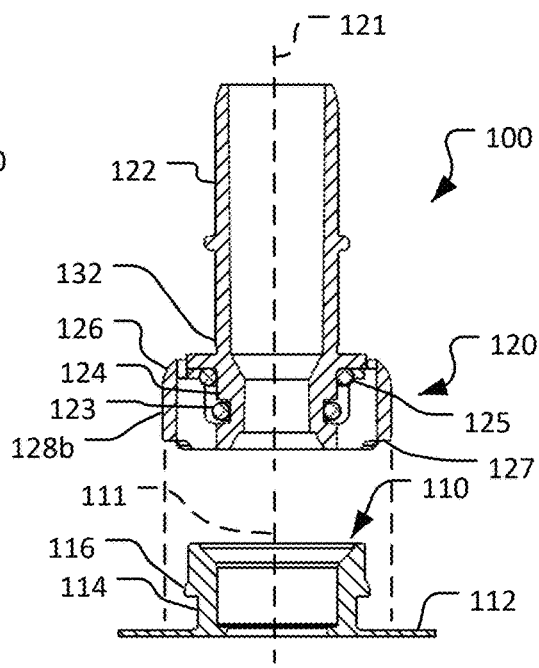
FIG. 3 is a longitudinal cross-section view of the exploded fluid coupling arrangement of FIG. 2.

The components of the fluid coupling 100 include a male coupling portion 110 and a female coupling portion 120. For simplicity, the male coupling portion 110 will be referred to as the male coupling 110 and the female coupling portion 120 will be referred to as the female coupling 120. As shown in FIG. 3, the male coupling 110 defines a longitudinal axis 111, and the female coupling 120 defines a longitudinal axis 121.

Figure 1:
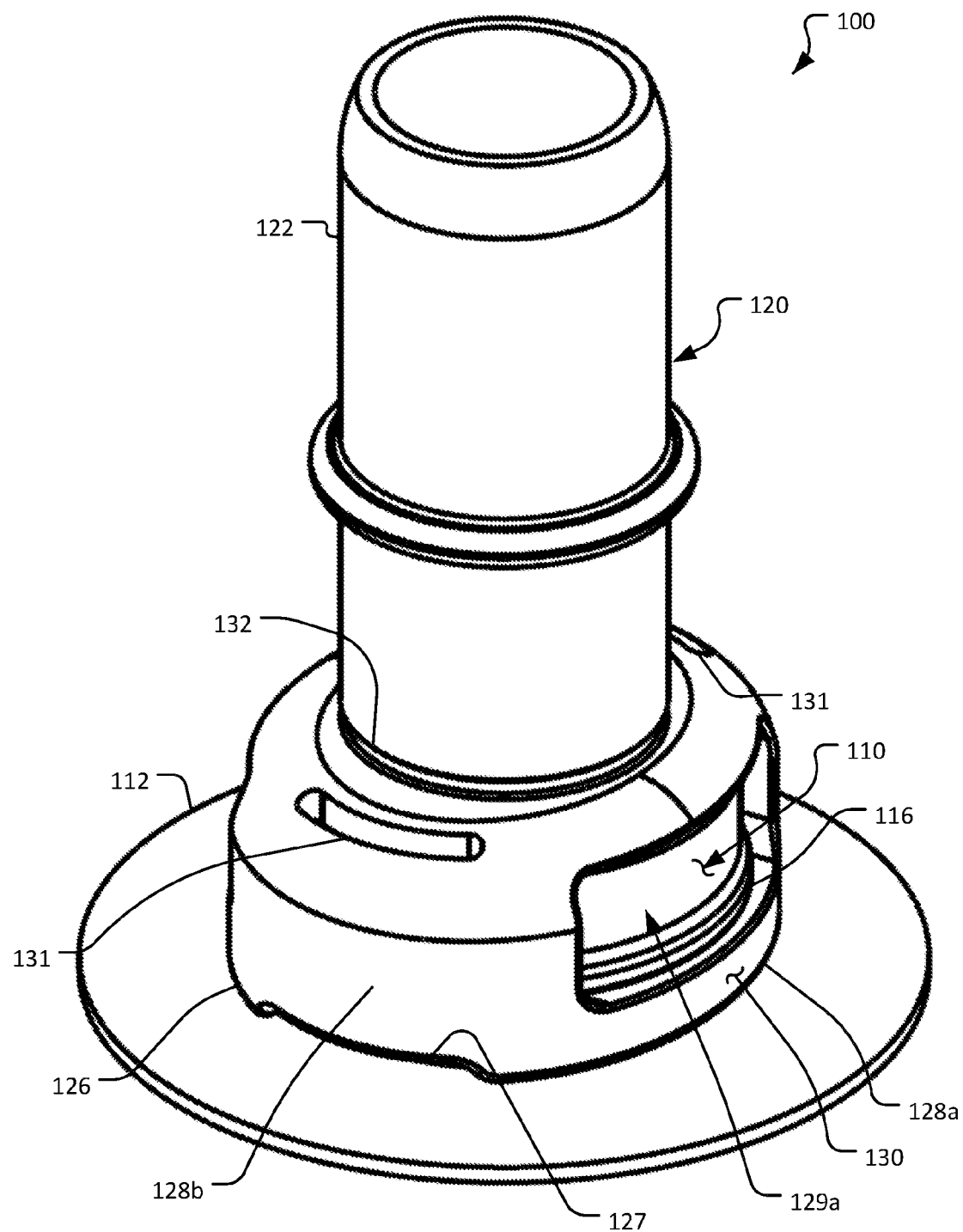
FIG. 1 is a perspective view of an example fluid coupling in a coupled arrangement in accordance with some embodiments described herein.
Figure 2:
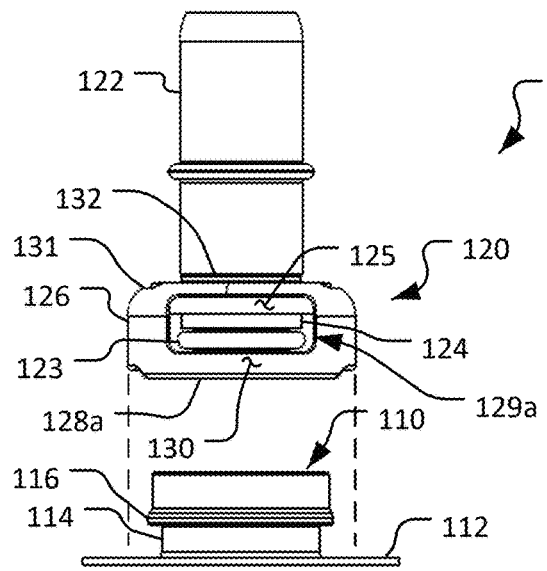
FIG. 2 is an exploded side view of the fluid coupling of FIG. 1 in an uncoupled arrangement.

The fluid coupling 100 can be configured in a coupled or connected arrangement (FIGS. 1, 4, and 5) and an uncoupled or disconnected arrangement (FIGS. 1 and 2). When the fluid coupling 100 is in the coupled arrangement, a longitudinally-extending open fluid flow path 102 (see e.g., FIG. 5) is created through the male coupling 110 and the female coupling portion 120.

The materials from which one or more of the components of the male fluid coupling 110 and the female fluid coupling 120 (and other fluid couplings described herein) can be made of include thermoplastics. In particular embodiments, the materials from which the components of the male fluid coupling 110 and the female fluid coupling 120 are made of are thermoplastics, such as, but not limited to, acetal, ABS, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the male fluid coupling 110 and the female fluid coupling 120 are made of include metals such as, but not limited to copper, stainless steel, brass, aluminum, plated steel, zinc alloys, and the like. In particular embodiments, one or both of the male fluid coupling 110 and/or the female fluid coupling 120 is/are metallic-free.

In some embodiments, as described further below, the male fluid coupling 110 and/or the female fluid coupling 120 can include one or more seal members. In some embodiments, the seal members can comprise materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shape of such seal members can be circular, D-shaped, X-shaped, square, rectangular, U-shaped, multi-lobed, L-shaped, V-shaped, and the like, or any other suitable shape, without limitation.

In the depicted embodiment, one end of the male coupling 110 is a base 112. The base 112 configures the male coupling 110 to be affixed to a surface of another fluid conveyance or containment component such as a manifold, chamber, plate, casing, tube, housing, and the like, without limitation. In some embodiments, the base 112 can be affixed to such a surface by any suitable process including, but not limited to, welding, brazing, soldering, press-fitting, threading, adhering, clamping, and the like.

In the depicted embodiment, one end of the female coupling 120 is a fluid connection 122. The depicted connection 122 configures the female coupling 120 to be fluidly coupled with a fluid conduit such as, but not limited to, a tube, pipe, a manifold, and the like, without limitation.

While the depicted male coupling 110 includes the base 112, and the depicted female coupling 120 includes the fluid connection 122, in some embodiments the base 112 and/or the fluid connection 122 can be replaced by another configuration such as, but not limited to, a threaded connection (e.g., straight thread or pipe thread), a compression fitting, a quick disconnect, a sanitary fitting, hydraulic quick connection, luer fitting, a solder connection, a welded connection, and so on, without limitation. Such connections can be straight (as depicted) or in another arrangement such as, but not limited to, a 90° elbow arrangement, a 45° elbow, a straight fitting, a Tee fitting, a Y-fitting, and so on.

The male coupling 110 includes a cylindrical body 114 extending from the base 112, and a ridge portion 116 attached to the cylindrical body 114. The cylindrical body 114 has a first outer diameter. The ridge portion 116 has a second outer diameter that is greater than the first outer diameter of the cylindrical body 114. In other words, the ridge portion 116 radially extends beyond the outer diameter of the cylindrical body 114. Said another way, the ridge portion 116 is a step change in the outer diameter of the male coupling 110 (in comparison to the cylindrical body 114). That step change in the outer diameter provided by the ridge portion 116 is used to latch the male coupling 110 and the female coupling 120 to each other, as described further below.

The female coupling 120 includes the fluid connection 122 and an opposite end portion that comprises an inner sleeve 124 and an ovular outer collar 126. The ovular outer collar 126 radially surrounds the inner sleeve 124.

As best seen in FIG. 1, the ovular outer collar 126 includes (i) a pair of first wall portions 128a that face each other and are spaced apart at a first distance and (ii) a pair of second wall portions 128b that face each other and are spaced apart at a second distance that is greater than the first distance. The oblong ovular shape of the outer collar 126 is a result of the arrangement where the first wall portions 128a are closer to each other than the second wall portions 128b. The oblong ovular shape can be elliptical, rectangular, an elongated circle shape, a racetrack shape, egg-shaped, and the like, without limitation. In some embodiments, the ovular outer collar 126 is bisymmetrical (e.g., about its major and minor axes).

Each first wall portion 128a of the pair of first wall portions 128a defines a wall opening 129a. As a result of defining the openings 129a, an end of each of the first wall portions 128a includes a flexible portion 130 at the end of the outer collar 126. As described further below, the flexible portions 130 are deflected radially outward during the connection and disconnection of the male coupling 110 and the female coupling portion 120.

Figure 4:
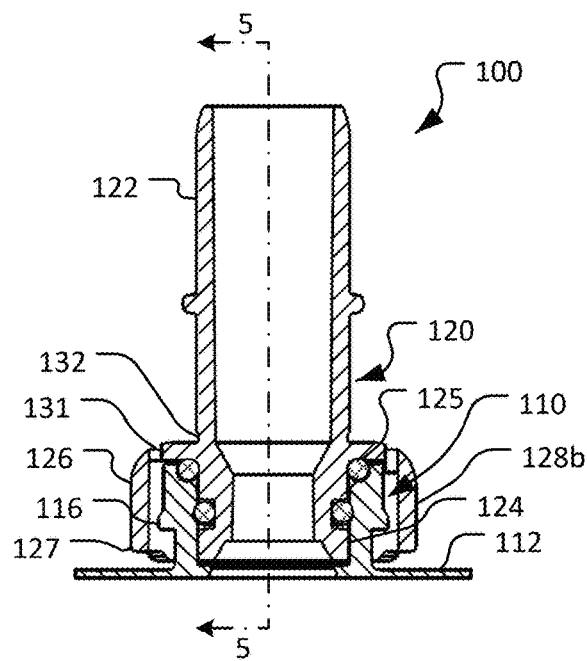
FIG. 4 is a first longitudinal cross-section view of the fluid coupling of FIG. 1 in a coupled arrangement.

To connect the male coupling 110 and the female coupling portion 120, a user can align and move the male coupling 110 and the female coupling portion 120 longitudinally toward each other along their respective axes 111 and 121. As the male coupling 110 and the female coupling portion 120 are being moved together, the flexible portions 130 of the ovular outer collar 126 will come into contact with a chamfered, lead-in portion of the ridge portion 116. However, the second wall portions 128b (which are spaced apart farther than the first wall portions 128a) will not contact the ridge portion 116. Instead, the second wall portions 128b are radially outward and spaced apart from the outer diameter of the ridge portion 116 (e.g., as seen in FIG. 4).

Figure 5:
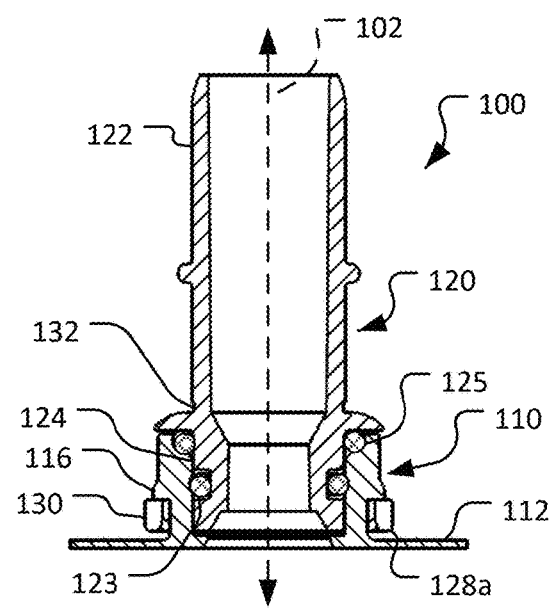
FIG. 5 is a second longitudinal cross-section view of the fluid coupling of FIG. 1 in a coupled arrangement.

The ridge portion 116 of the male coupling 110 includes a frustoconical ramp surface. The ramp surface abuts against and forces the flexible portions 130 to deflect radially outward as the male coupling 110 and the female coupling 120 are being longitudinally pushed into a coupled engagement with each other. As the longitudinal movement of the male coupling 110 and the female coupling 120 toward each other is continued, the deflected flexible portions 130 will eventually be moved past the ridge portion 116 and will then return, radially-inward, to their natural un-deflected configurations. In their un-deflected configurations, the flexible portions 130 are spaced apart from each other at a distance that is less than an outer diameter of the ridge portion 116. Accordingly, the flexible portions 130 will engage with/against the ridge portion 116 to latch together male coupling 110 and the female coupling 120 in their connected arrangement (as best seen in FIG. 5). While the male coupling 110 and the female coupling 120 are latched together in the coupled/connected configuration, segments of the ridge portion 116 extend into the openings 129a.

In some embodiments, when the male coupling 110 and the female coupling 120 become latched together in their coupled arrangement, an audible snap noise is created that provides the user with audible feedback indicating that the coupled configuration has been properly made. Tactile feedback may also be provided as the male coupling 110 and the female coupling 120 become latched together.

In some embodiments (such as the depicted embodiment), the female coupling 120 is rotatable in relation to the male coupling 110 while the fluid coupling 100 is in the coupled configuration. That is, in some embodiments the female coupling 120 can be rotated 360° about its longitudinal axis 121 relative to the male coupling 110 while the fluid coupling 100 remains in the coupled configuration. In some embodiments, it is not possible for such rotation to take place, or only a limited degree of rotation can take place.

While the male coupling 110 and the female coupling 120 are latched together in the coupled/connected configuration, the ovular outer collar 126 is radially outside of the cylindrical body portion 114 of the male coupling 110. In addition, while the male coupling 110 and the female coupling 120 are latched together in the coupled/connected configuration, the inner sleeve 124 of the female coupling 120 is radially within the cylindrical body portion 114 of the male coupling 110.

The fluid coupling 100 includes a first seal member 123 and a second seal member 125. In the depicted embodiment, the first seal member 123 and the second seal member 125 are each engaged around the inner sleeve 124 of the female coupling 120. In some embodiments, one or both of the first seal member 123 and the second seal member 125 can be engaged with the male coupling 110 rather than being engaged with the female coupling 120.

While the male coupling 110 and the female coupling 120 are latched together in the coupled/connected configuration, the first seal member 123 fluidly seals against a cylindrical inner wall portion of the male coupling 110 (as shown in FIGS. 4 and 5). In addition, while the male coupling 110 and the female coupling 120 are latched together in the coupled/connected configuration, the second seal member 125 seals against a frustoconical inner wall portion of the male coupling 110 (as also shown in FIGS. 4 and 5). In these arrangements, the first seal member 123 provides a fluid seal, and the second seal member 125 provides an environmental seal. That is, the first seal member 123 prevents fluid leaks from the fluid coupling 100 when fluid is present within the connected fluid coupling 100. The second seal member 125 prevents external contamination (e.g., liquids, dirt particles, etc.) from entering into the interface areas between the male coupling 110 and the female coupling 120.

The second seal member 125 also serves another purpose while the male coupling 110 and the female coupling 120 are latched together in the coupled/connected configuration. The second seal member 125 becomes longitudinally (axially) compressed when the male coupling 110 and the female coupling 120 are latched together. Accordingly, the elastic/resilient second seal member 125 acts as a spring to exert a longitudinal force that would tend to separate the male coupling 110 from the female coupling 120 but for the fact that, while the male coupling 110 and the female coupling 120 are latched together in the coupled/connected configuration, segments of the ridge portion 116 extend into the openings 129a (so that the engagement of the flexible portions 130 against the ridge portion 116 prevent such separation). In some embodiments, a spring (e.g., a wave spring, spring washer, or coil spring) can be substituted for the second seal member 125.

In some embodiments, such as the depicted embodiment, the portions of the inner sleeve 124 of the female coupling 120 that one or both of the seal members 123/125 are seated on have an outer diameter that is/are smaller than the width of one or both of the wall openings 129a. Such a relative dimensional arrangement can be beneficial for making the female coupling 120 using an injection molding process, for example.

In some embodiments, such as the depicted embodiment, an end of the ovular outer collar 126 defines one or more scallops 127. For example, in the depicted embodiment, a scallop 127 is defined along the end of each of the second wall portions 128b. The one or more scallops 127 can provide a passage for environmental fluids and other contaminants (not the fluid within the flow path 102) to drain or weep out from within internal spaces between the male coupling 110 and the female coupling 120.

To uncouple the male coupling 110 and the female coupling 120, a user can apply compressive forces to the second wall portions 128b to force them towards each other. Because of the oblong shape of the ovular outer collar 126, those compressive forces will deflect the second wall portions 128b radially inward and, in turn, deflect the flexible portions 130 of the first wall portions 128a radially outward. At some point as the flexible portions 130 are being deflected radially outward from the compressive forces applied to the second wall portions 128b, the spacing between the flexible portions 130 will become larger than the outer diameter of the ridge portion 116 of the male coupling 110. When that is the case, then the user can then longitudinally separate the male coupling 110 and the female coupling 120.

In some embodiments, such as the depicted embodiment, one or both of the second wall portions 128b of the ovular outer collar 126 can define an opening 131 (e.g., see FIG. 1). The opening 131 can make the second wall portions 128b more readily compressible/deflectable to facilitate the process of coupling and/or uncoupling the male coupling 110 and the female coupling 120.

In some embodiments, the female coupling 120 optionally includes an area of reduced strength 132. In the depicted embodiment, the area of reduced strength 132 is a particular area of the female coupling 120 that has a thinner wall portion as compared to other areas of the female coupling 120. An advantage provided by the area of reduced strength 132 is that when excessive forces are applied to the fluid coupling 100 (e.g., side loads), the resultant breakage will occur in a controlled and predictable fashion. In addition, the male coupling 110 will tend to be undamaged. This can be advantageous because, in some embodiments, the male coupling 110 is permanently attached to a surface of another component that is not easily replaceable. Accordingly, in such a case it can be advantageous to allow the female coupling 120 to break (as a result of area of reduced strength 132) because the female coupling 120 can tend to be more easily replaceable than the male coupling 110.

Figure 6:
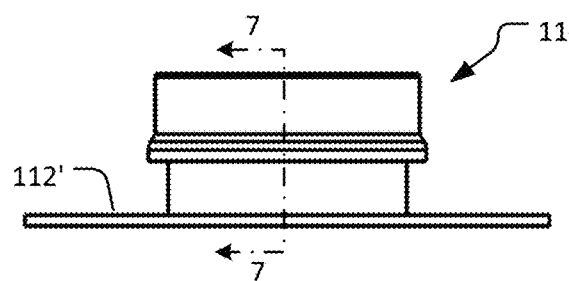
FIG. 6 is a side view of another example male coupling that can be used with some embodiments of the fluid couplings described herein.
Figure 7:
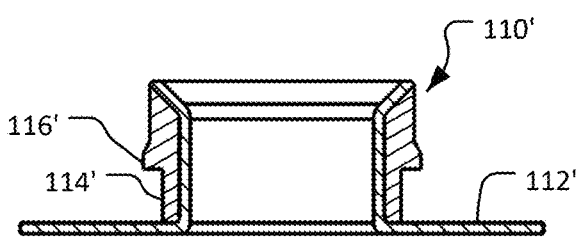
FIG. 7 is a longitudinal cross-section view of the male coupling of FIG. 6.

FIGS. 6 and 7 depict an alternative design male coupling 110'. The male coupling 110' is different from the male coupling 110 in that the male coupling 110' is a two-part, composite construction. That is, the male coupling 110' includes: (i) a contiguous base 112' and inner cylinder in combination with (ii) an overlaid outer member that comprises the exterior portions of the cylindrical body 114' and the ridge portion 116'. The two materials of construction of the male coupling 110' can be any suitable combination of materials such as, but not limited to, both plastic, both metal, or metal and plastic in combination.

Figure 8:
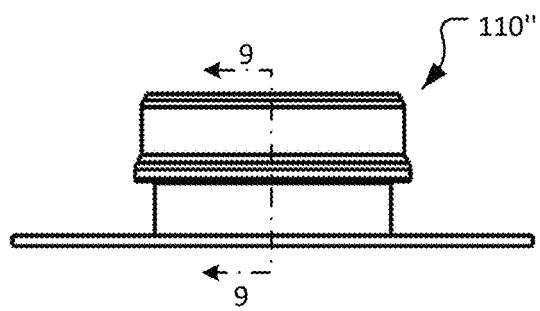
FIG. 8 is a side view of another example male coupling that can be used with some embodiments of the fluid couplings described herein.
Figure 9:
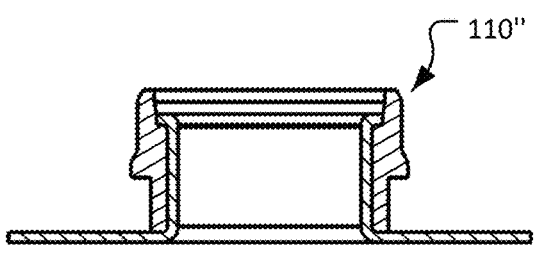
FIG. 9 is a longitudinal cross-section view of the male coupling of FIG. 8.
Figure 10:
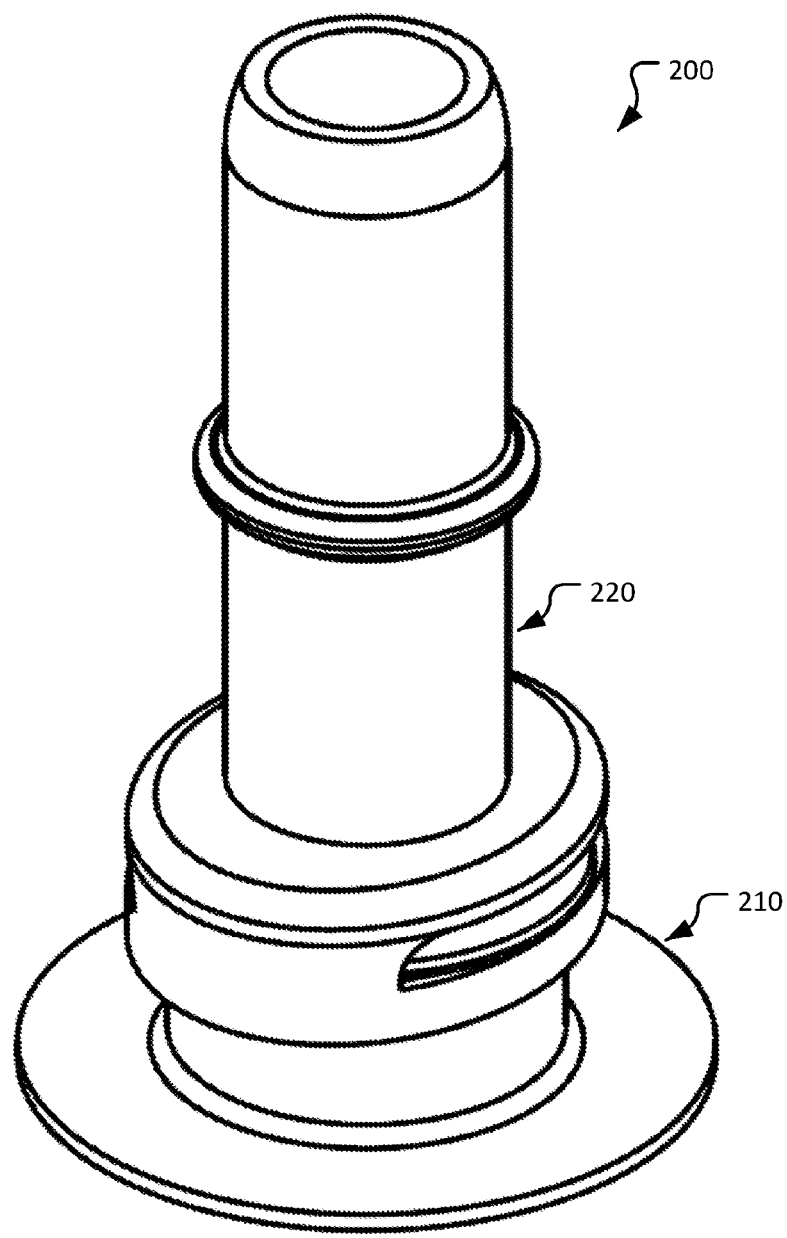
FIG. 10 is a perspective view of another example fluid coupling in a coupled arrangement in accordance with some embodiments described herein.

FIGS. 8 and 9 depict another alternative design male coupling 110". The depicted male coupling 110" is a two-part, composite construction like the male coupling 110'. The male coupling 110" is different from the male coupling 110 and the male coupling 110' in that the male coupling 110" has a seat for the second seal member 125 (e.g., see FIGS. 4 and 5) that is essentially cylindrical instead of frustoconical.

FIGS. 10-14 depict an alternative design fluid coupling 200. The functionality of the fluid coupling 200, with its male coupling 210 and female coupling 220, is the same as the fluid coupling 100 as described above. However, there are some design differences. For example, the design of the male coupling 210 is different from the male coupling 110 in that the ridge portion 216 is located at an end of the male coupling 210 that is opposite from the base 212 (rather than being approximately midway between the two ends as in the male coupling 110). This design of the male coupling 210 can make the male coupling 210 easier to manufacture in some cases.

Figure 11:
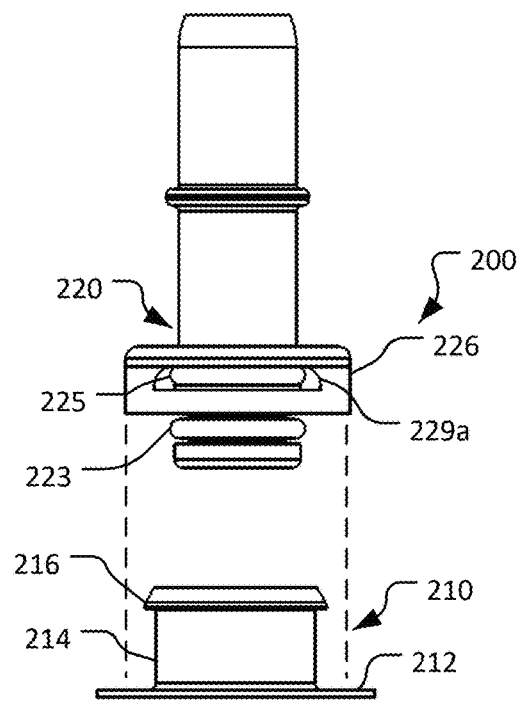
FIG. 11 is an exploded side view of the fluid coupling of FIG. 10 in an uncoupled arrangement.
Figure 12:
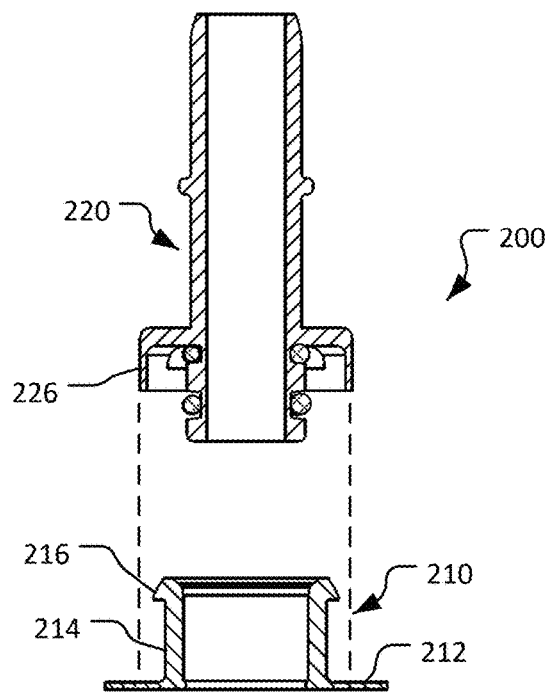
FIG. 12 is a longitudinal cross-section view of the exploded fluid coupling arrangement of FIG. 11.
Figure 13:
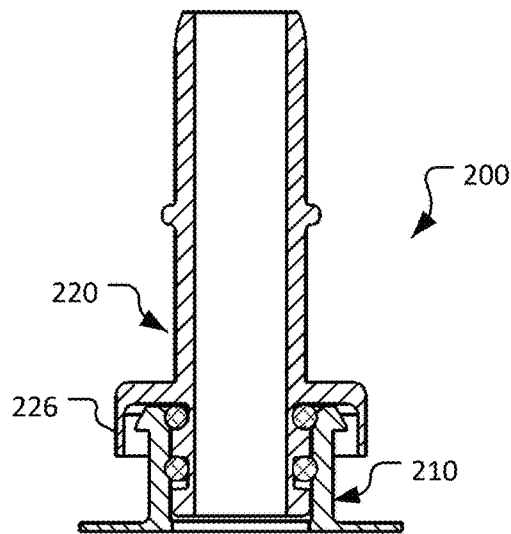
FIG. 13 is a first longitudinal cross-section view of the fluid coupling of FIG. 10 in a coupled arrangement.
Figure 14:
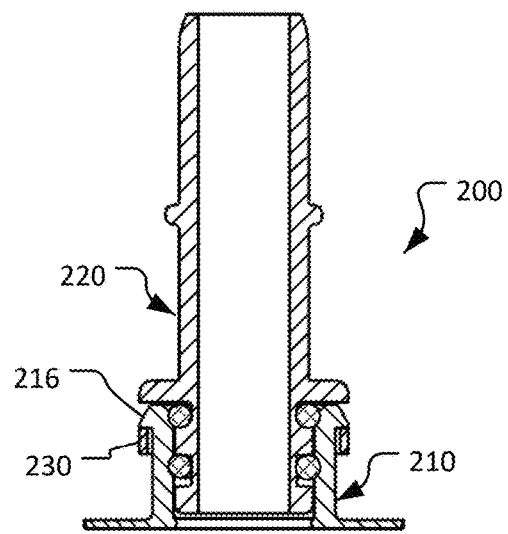
FIG. 14 is a second longitudinal cross-section view of the fluid coupling of FIG. 10 in a coupled arrangement.

Another difference between the fluid coupling 200 and the fluid coupling 100 is that (as best seen in FIG. 11) the seat for the first seal member 223 is not radially within the opening 229a, and the ovular outer collar 226 is not radially outward of the seat for the first seal member 223. The seat for the second seal member 225, in contrast, is radially within and smaller than the width of the opening 229a.

Another difference between the fluid coupling 200 and the fluid coupling 100 is that the ovular outer collar 226 is longitudinally shorter than the ovular outer collar 126 of the female coupling 120. This alteration can cause the compressive forces required to deflect the ovular outer collar 226 to uncouple the male coupling 210 and female coupling 220 to be increased as compared to the ovular outer collar 126.

Additional Design Variations and Embodiments

While in the depicted embodiments the outer sleeve of the female couplings are oblong or ovular and the male coupling has a circular cross-sectional shape, some embodiments have the reverse arrangement. That is, the cross-sectional shape of the male coupling is oblong or ovular, and the outer sleeve of the female coupling is circular/cylindrical. In such a case, while the male and female couplings are connected, portions of the circular/cylindrical outer sleeve of the female coupling are engaged with the ovular male coupling and other portions of the circular/cylindrical outer sleeve of the female coupling are not engaged with the ovular male coupling. Rather, the unengaged portions are spaced apart from the ovular male coupling. Disconnection of the male and female couplings can be performed by manually compressing the portions of the circular/cylindrical outer sleeve of the female coupling that are not engaged with the ovular male coupling. Such compressing will disengage all portions of the circular/cylindrical outer sleeve of the female coupling from the ovular male coupling.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes described above and/or depicted in the accompanying figures do not necessarily require the particular order shown, or sequential order, to achieve desirable results. In certain implementations, multitasking and parallel processing may be advantageous.

What is claimed is:

1. A fluid coupling comprising:
a male coupling defining a first longitudinal axis and an open flow path extending along the first longitudinal axis between both ends of the male coupling, the male coupling comprising: (i) a cylindrical body portion having a first outer diameter and (ii) a ridge portion attached to the cylindrical body portion and having a second outer diameter that is larger than the first outer diameter; and
a female coupling defining a second longitudinal axis and an open flow path extending along the second longitudinal axis between both ends of the female coupling, the female coupling comprising: (i) a first end portion comprising a termination structure configured for attaching a fluid conduit to the female coupling and (ii) a second end portion comprising an inner sleeve, an ovular outer collar radially surrounding the inner sleeve, a first seal member, and a second seal member,
wherein the ovular outer collar comprises: (i) a pair of first wall portions that face each other and are spaced apart at a first distance and (ii) a pair of second wall portions that face each other and are spaced apart at a second distance that is greater than the first distance,
wherein each first wall portion of the pair of first wall portions defines an opening, and
wherein, while the male and female couplings are connected together:
the first seal member fluidly seals against a first cylindrical inner wall portion of the male coupling;
the second seal member seals against a frustoconical inner wall portion of the male coupling;
the inner sleeve is radially within the cylindrical body portion of the male coupling;
the ovular outer collar is radially outside of the cylindrical body portion of the male coupling; and
the ridge portion extends into each of the openings defined by the pair of first wall portions.

2. The fluid coupling of claim 1, wherein an outer diameter of a first seat at which the first seal member is positioned is smaller than a width of at least one of the openings.

3. The fluid coupling of claim 1, wherein an outer diameter of a second seat at which the second seal member is positioned is smaller than a width of at least one of the openings.

4. The fluid coupling of claim 1, wherein the second end portion of the female coupling includes a second seal member, and
   wherein, while the male and female couplings are connected together, the second seal member fluidly seals against a second cylindrical inner wall portion of the male coupling.

5. The fluid coupling of claim 1, wherein the ovular outer collar is bisymmetrical.

6. The fluid coupling of claim 1, wherein a junction between the first and second end portions of the female coupling comprises an area of reduced strength.

7. The fluid coupling of claim 1, wherein each of the second wall portions of the ovular outer collar defines an opening.

8. The fluid coupling of claim 1, wherein an end of the ovular outer collar defines a scallop along each of the second wall portions.

9. A method of disconnecting the male and female couplings of claim 1, the method comprising:
   compressing the pair of second wall portions toward each other to increase the first distance to be greater than the second outer diameter of the ridge portion of the male coupling; and
   longitudinally separating the male and female couplings from each other during the compressing.

* * * * *